(12) United States Patent
Parsley, Jr. et al.

(10) Patent No.: US 6,724,306 B1
(45) Date of Patent: Apr. 20, 2004

(54) LUGGAGE LOCATING SYSTEM

(76) Inventors: Ralph O. Parsley, Jr., 12298 Mountain View Ter., Jacksonville, FL (US) 32225; Ralph O. Parsley, Sr., 8845 Cox Rd., Indianapolis, IN (US) 46221; Michael J. Smith, 7047 Lesta, Indianapolis, IN (US) 46217

( * ) Notice: Subject to any disclaimer, the term of this patent is extended or adjusted under 35 U.S.C. 154(b) by 2 days.

(21) Appl. No.: 10/177,300

(22) Filed: Jun. 21, 2002

(51) Int. Cl.⁷ .............................................. G08B 13/14
(52) U.S. Cl. ................................ 340/568.1; 340/568.6; 340/568.8; 340/571; 340/573.1; 340/539; 340/825.36; 340/825.49
(58) Field of Search ........................ 340/568.1, 568.6, 340/568.8, 571, 573.1, 539, 825.49, 825.36

(56) References Cited

U.S. PATENT DOCUMENTS

| | | |
|---|---|---|
| 5,043,702 A | 8/1991 | Kuo |
| 5,478,991 A | 12/1995 | Watanabe et al. |
| 5,552,773 A * | 9/1996 | Kühnert ..................... 340/539 |
| 5,576,692 A | 11/1996 | Tompkins et al. |
| 5,650,768 A | 7/1997 | Eswaran |
| 5,677,673 A * | 10/1997 | Kipnis ........................ 340/539 |
| 5,680,105 A * | 10/1997 | Hedrick ..................... 340/539 |
| 5,686,891 A * | 11/1997 | Sacca et al. ................. 340/539 |
| D398,871 S | 9/1998 | Salami |
| 5,939,981 A * | 8/1999 | Renney ....................... 340/539 |
| 5,963,131 A * | 10/1999 | D'Angelo et al. ........ 340/568.1 |
| 6,036,348 A | 3/2000 | Miura |
| 6,108,636 A | 8/2000 | Yap et al. |
| 6,265,975 B1 * | 7/2001 | Zimmerman ................ 340/571 |
| 6,304,183 B1 * | 10/2001 | Causey .................... 340/572.1 |

* cited by examiner

*Primary Examiner*—Jeffery Hofsass
*Assistant Examiner*—Hung Nguyen

(57) ABSTRACT

A luggage locating system for facilitating location of luggage within an airport. The luggage locating system includes a remote transceiver assembly comprising a first transceiver means for transmitting a unique remote signal. A base transceiver assembly comprises a second transceiver means for transmitting a unique luggage signal. The second transceiver means transmits the unique luggage signal to the first transceiver means when the second transceiver means has received the unique remote signal from the first transceiver means. The first transceiver assembly comprises an indicator assembly. The indicator assembly is operationally coupled to the first transceiver means whereby the first transceiver means actuates the indicator assembly for indicating to the user that the base transceiver assembly is within a predetermined range of the user when the first transceiver means receives the unique luggage signal from the second transceiver means.

7 Claims, 3 Drawing Sheets

LUGGAGE LOCATING SYSTEM

BACKGROUND OF THE INVENTION

1. Field of the Invention

The present invention relates to airport luggage tracking systems and more particularly pertains to a new luggage locating system for facilitating location of luggage within an airport.

2. Description of the Prior Art

The use of airport luggage tracking systems is known in the prior art. U.S. Pat. No. 5,576,692 describes a system for tracking luggage from airport to airport. U.S. Pat. No. 5,043,702 has an alarm device positioned within a piece of luggage for deterring and stopping theft of the luggage. U.S. Pat. No. 6,108,636 has a luggage handling and reconciliation system with biometrics input device positioned in the luggage for collecting biometric data of the holder of the bag and comparing that information with data collected upon entrance to the plane to identify that the user has entered the plane and the luggage can be loaded. U.S. Pat. No. 5,650,768 has a automatic baggage claiming apparatus to control access to a secured baggage area to compare identifying baggage code with a identifying claim code to allow the passenger to collect only the correct baggage. U.S. Pat. No. 6,036,348 has a luggage management system to improve efficiency of parcel collection, examining and delivery. U.S. Pat. No. 5,478,991 has a aircraft baggage management system for controlling information of baggage being loaded onto an aircraft. U.S. Pat. No. Des. 398,871 shows an anti-theft luggage alarm unit.

SUMMARY OF THE INVENTION

An object of the present invention is to provide a new luggage locating system that detects the presence of the user's luggage.

Even still another object of the present invention is to provide a new luggage locating system that detects whether the luggage of the user is getting closer or farther away and alerts the user in case the luggage is getting farther away from the client.

To this end, the present invention generally comprises a remote transceiver assembly comprising a body member. The body member is designed for being held in a hand of the user. The remote transceiver assembly comprises a first transceiver means for transmitting a unique remote signal. The first transceiver means is positioned within the body member. The remote transceiver assembly comprises a button member. The button member is operationally coupled to the first transceiver whereby the button member is for actuating the first transceiver means to transmit the unique remote signal. The remote transceiver assembly comprises a remote power supply being operationally coupled to the first transceiver whereby the remote power supply supplies power to the first transceiver. A base transceiver assembly comprises a housing. The housing is designed for being mounted to the luggage. The base transceiver assembly comprises a second transceiver means for transmitting a unique luggage signal. The second transceiver means transmits the unique luggage signal to the first transceiver means when the second transceiver means has received the unique remote signal from the first transceiver means. The second transceiver means is positioned within the housing of the base transceiver assembly. The base transceiver assembly comprises a base power supply whereby the base power supply supplies power to the second transceiver means. The first transceiver assembly comprises an indicator assembly. The indicator assembly is operationally coupled to the first transceiver means whereby the first transceiver means actuates the indicator assembly for indicating to the user that the base transceiver assembly is within a predetermined range of the user when the first transceiver means receives the unique luggage signal from the second transceiver means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
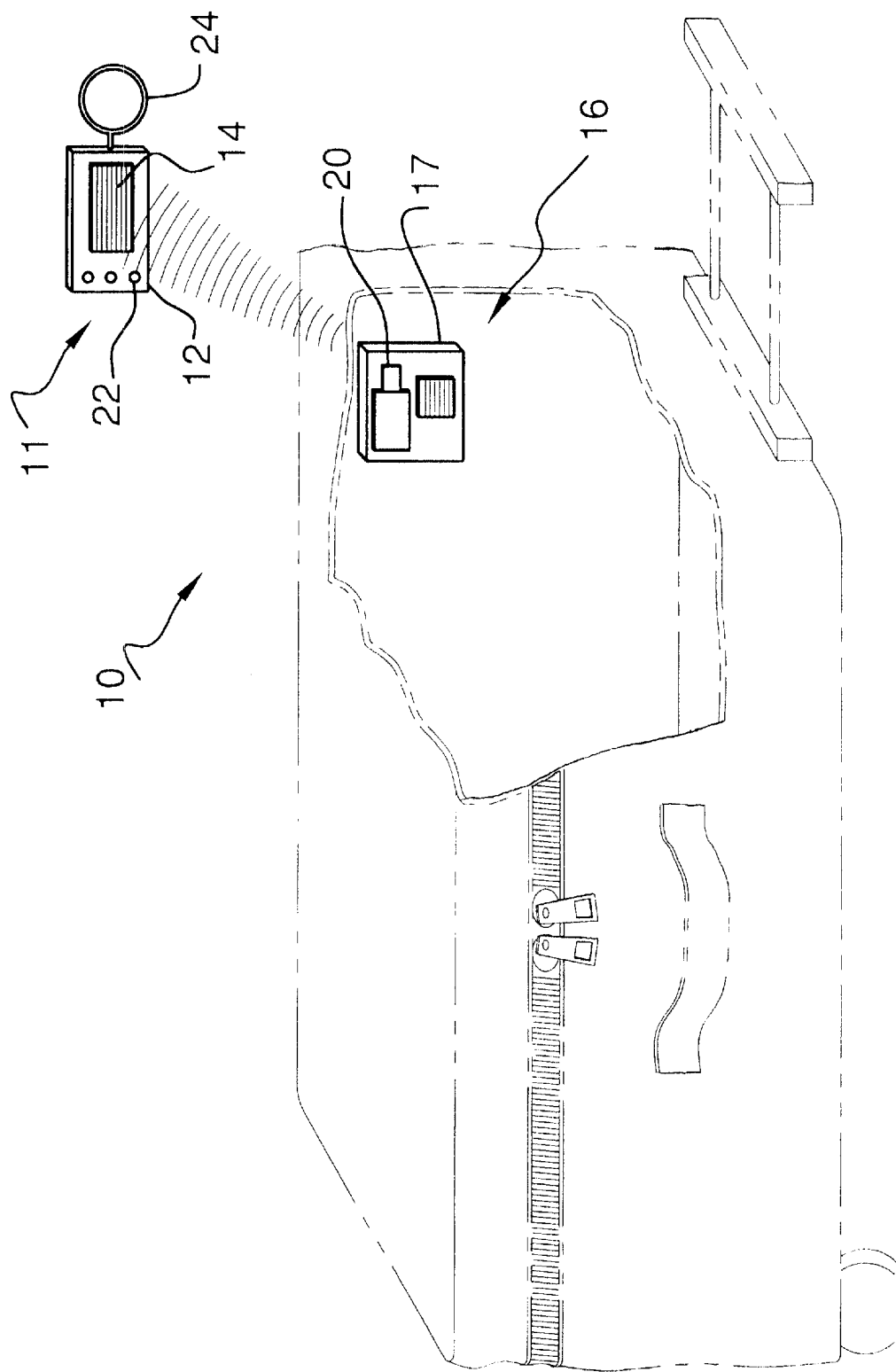
FIG. 1 is a perspective view of a new luggage locating system according to the present invention in use.
Figure 2:
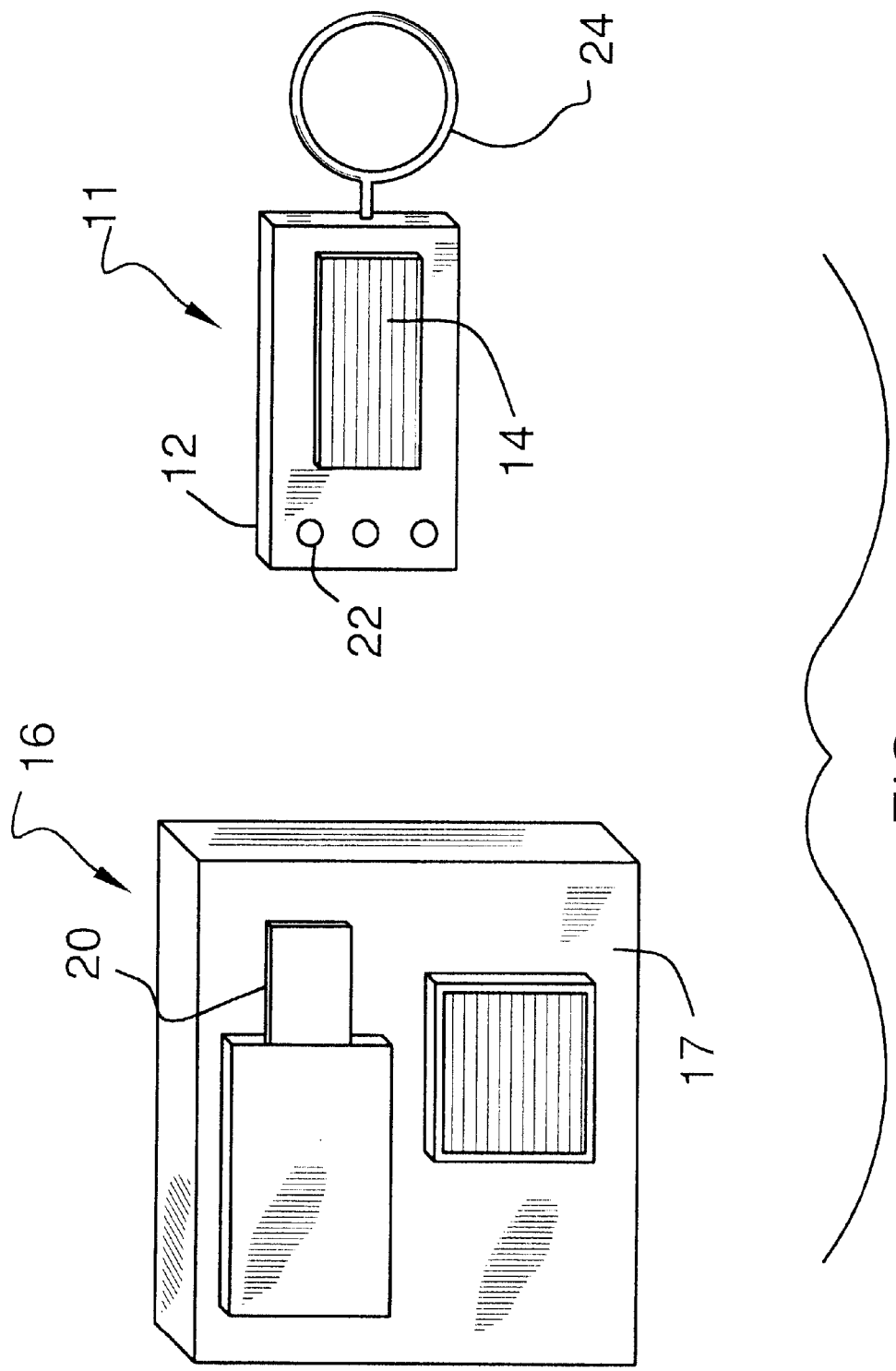
FIG. 2 is an enlarged perspective view of the present invention.
Figure 3:
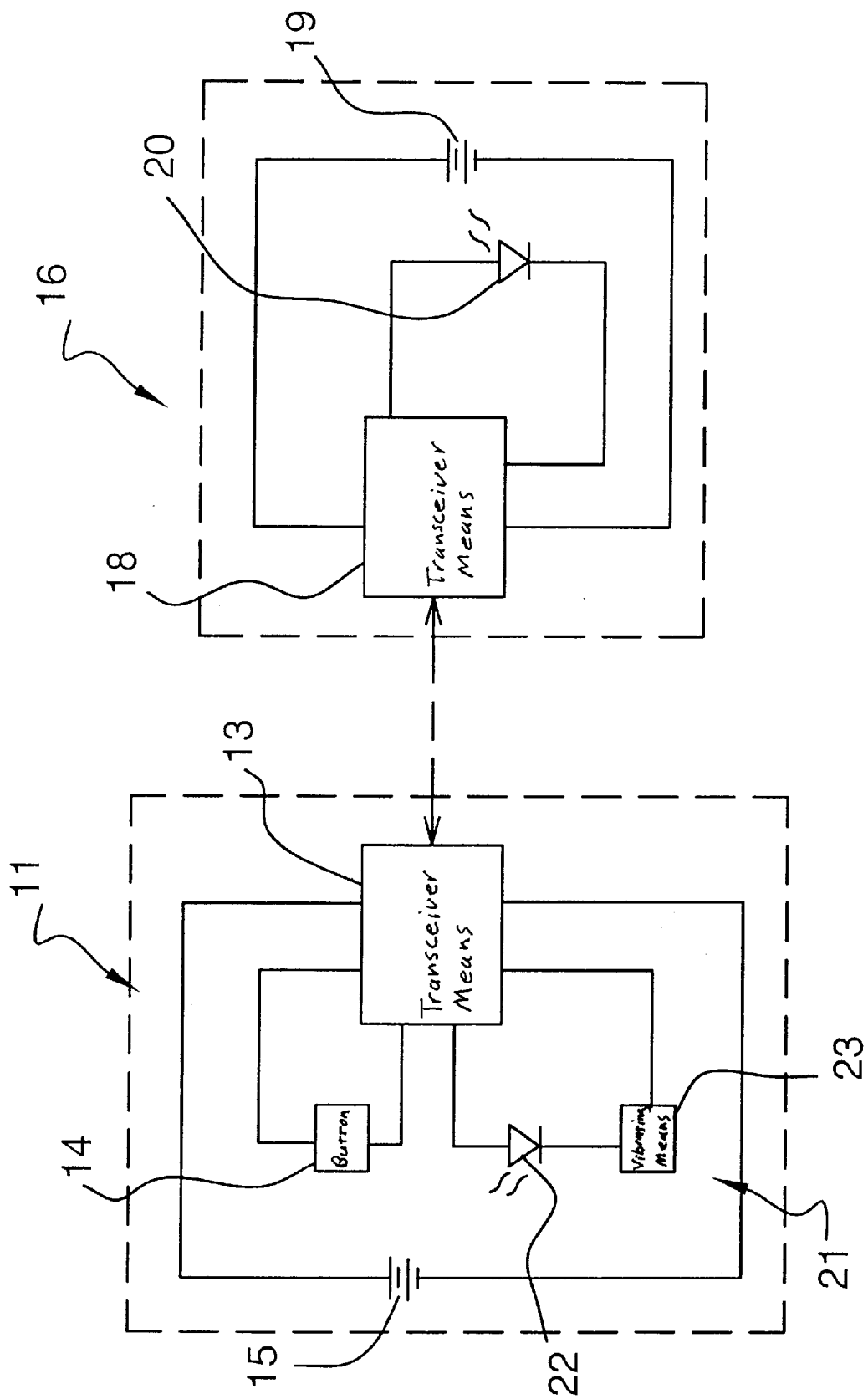
FIG. 3 is a schematic view of the present invention.

With reference now to the drawings, and in particular to FIGS. 1 through 3 thereof, a new luggage locating system embodying the principles and concepts of the present invention and generally designated by the reference numeral 10 will be described.

As best illustrated in FIGS. 1 through 3, the luggage locating system 10 generally comprises a remote transceiver assembly 11 comprising a body member 12. The body member 12 is designed for being held in a hand of the user. The remote transceiver assembly 11 comprises a first transceiver means 13 for transmitting a unique remote signal. The first transceiver means 13 is positioned within the body member 12. The remote transceiver assembly 11 comprises a button member 14. The button member 14 is operationally coupled to the first transceiver means 13 whereby the button member 14 is for actuating the first transceiver means 13 to transmit the unique remote signal. The remote transceiver assembly 11 comprises a remote power supply 15 being operationally coupled to the first transceiver whereby the remote power supply 15 supplies power to the first transceiver.

A base transceiver assembly 16 comprises a housing 17. The housing 17 is designed for being mounted to the luggage. The base transceiver assembly 16 comprises a second transceiver means 18 for transmitting a unique luggage signal. The second transceiver means 18 transmits the unique luggage signal to the first transceiver means 13 when the second transceiver means 18 has received the unique remote signal from the first transceiver means 13. The second transceiver means 18 is positioned within the housing 17 of the base transceiver assembly 16. The base transceiver assembly 16 comprises a base power supply 19 whereby the base power supply 19 supplies power to the second transceiver means 18.

The base transceiver assembly 16 comprises a base light emitting member 20. The base light emitting member 20 is operationally coupled to the second transceiver means 18 whereby the base light emitting member 20 emits light when the second transceiver means 18 has received the unique remote signal.

The first transceiver assembly comprises an indicator assembly 21. The indicator assembly 21 is operationally coupled to the first transceiver means 13 whereby the first transceiver means 13 actuates the indicator assembly 21 for indicating to the user that the base transceiver assembly 16 is within a predetermined range of the user when the first transceiver means 13 receives the unique luggage signal from the second transceiver means 18.

The indicator assembly 21 of the remote transceiver assembly 11 comprises at least one remote light emitting member 22. The remote light emitting member 22 is operationally coupled to the first transceiver means 13 whereby the remote light emitting member 22 emits light when the first transceiver means 13 has received the unique luggage signal. The remote light emitting member 22 is designed for indicating to the user that the base transceiver assembly 16 is within the predetermined distance when the remote light emitting member 22 emits light.

The indicator assembly 21 of the remote transceiver assembly 11 comprises a vibrating means 23 for vibrating the body member 12 of the remote transceiver assembly 11. The vibrating means 23 is operationally coupled to the first transceiver means 13 whereby the vibrating means 23 vibrates the body member 12 when the first transceiver means 13 has received the unique luggage signal. The vibrating means 23 is designed for indicating to the user that the base transceiver assembly 16 is within the predetermined distance when the vibrating means 23 vibrates the body member 12.

The first transceiver means 13 of the remote transceiver assembly 11 intermittently transmits a timing signal. The second transceiver means 18 of the base transceiver assembly 16 receives the timing signal and transmits the timing signal back to the first transceiver means 13 of the remote transceiver assembly 11. The first transceiver means 13 times a time between transmission of the timing signal and reception of the timing signal by the first transceiver means 13 for determining whether the base transceiver assembly 16 is getting closer to the remote transceiver assembly 11. The first transceiver means 13 actuating the indicator assembly 21 for indicating that the base transceiver assembly 16 is getting farther away from the remote transceiver assembly 11 for alerting the user that the luggage may have been picked by a different user. The remote signal, the luggage signal and the timing signal are appropriately coded to allow only a combined pair of remote transceiver assembly 11 and base transceiver assembly 16 to communicate.

The body member 12 of the remote transceiver assembly 11 comprises a ring member 24. The ring member 24 is designed for receiving keys of the user whereby the body member 12 is selectively coupled to the keys of the user.

In use, the user couples the housing 17 of the base transceiver assembly 16 to the luggage to be put into cargo hold of the plane. Upon completion the user enters the baggage claim area and presses the button member 14 of the remote transceiver assembly 11. The body member 12 will vibrate and the remote light emitting member 22 will light to indicate that the luggage of the user is within a predetermined distance from the user, such as 100 feet. The remote transceiver assembly 11 intermittently transmits a timing signal and measures the amount of time for the timing signal to be relayed back to the remote transceiver assembly 11. The vibrating means 23 will vibrate again to indicate that the luggage is moving away from the user should the times between transmitting and receiving of the timing signal increase allowing to the user to look and see if their luggage was accidentally retrieved by a different passenger.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A luggage locating system for locating luggage of a user in an airport, the luggage locating system comprising:

a remote transceiver assembly comprising a body member, said body member being adapted for being held in a hand of the user, said remote transceiver assembly comprising a first transceiver means for transmitting a unique remote signal, said first transceiver means being positioned within said body member, said remote transceiver assembly comprising a button member, said button member being operationally coupled to said first transceiver means such that said button member is for actuating said first transceiver means to transmit said unique remote signal, said remote transceiver assembly comprising a remote power supply being operationally coupled to said first transceiver such that said remote power supply supplies power to said first transceiver;

a base transceiver assembly comprising a housing, said housing being adapted for being mounted to the luggage such that said base transceiver assembly is positioned in the luggage to prevent said base transceiver assembly from being damaged during handling, said base transceiver assembly comprising a second transceiver means for transmitting a unique luggage signal, said second transceiver means transmitting said unique luggage signal to said first transceiver means when said second transceiver means has received said unique remote signal from said first transceiver means, said second transceiver means being positioned within said housing of said base transceiver assembly, said base transceiver assembly comprising a base power supply such that said base power supply supplies power to said second transceiver means;

said first transceiver assembly comprising an indicator assembly, said indicator assembly being operationally coupled to said first transceiver means such that said first transceiver means actuates said indicator assembly for indicating to the user that said base transceiver assembly is within a predetermined range of the user when said first transceiver means receives said unique luggage signal from said second transceiver means; and wherein said first transceiver means of said remote transceiver assembly intermittently transmits a timing signal, said second transceiver means of said base transceiver assembly receiving said timing signal and transmitting said timing signal back to said first transceiver means of said remote transceiver assembly, said first transceiver means timing a time between transmission of said timing signal and reception of the timing signal by said first transceiver means for determining whether said base transceiver assembly is getting closer to said remote transceiver assembly, said first transceiver means actuating said indicator assembly for indicating that said base transceiver assembly is getting farther away from said remote transceiver assembly.

2. The luggage locating system as set forth in claim 1, further comprising:

said base transceiver assembly comprising a base light emitting member, said base light emitting member being operationally coupled to said second transceiver means such that said base light emitting member emits light when said second transceiver means has received said unique remote signal.

3. The luggage locating system as set forth in claim 1, further comprising:

said indicator assembly of said remote transceiver assembly comprising at least one remote light emitting member, said remote light emitting member being operationally coupled to said first transceiver means such that said remote light emitting member emits light when said first transceiver means has received said unique luggage signal, said remote light emitting member being adapted for indicating to the user that said base transceiver assembly is within the predetermined distance when said remote light emitting member emits light.

4. The luggage locating system as set forth in claim 3, further comprising:

said indicator assembly of said remote transceiver assembly comprising a vibrating means for vibrating said body member of said remote transceiver assembly, said vibrating means being operationally coupled to said first transceiver means such that said vibrating means vibrates said body member when said first transceiver means has received said unique luggage signal, said vibrating means being adapted for indicating to the user that said base transceiver assembly is within the predetermined distance when said vibrating means vibrates the body member.

5. The luggage locating system as set forth in claim 1, further comprising:

said indicator assembly of said remote transceiver assembly comprising a vibrating means for vibrating said body member of said remote transceiver assembly, said vibrating means being operationally coupled to said first transceiver means such that said vibrating means vibrates said body member when said first transceiver means has received said unique luggage signal, said vibrating means being adapted for indicating to the user that said base transceiver assembly is within the predetermined distance when said vibrating means vibrates the body member.

6. The luggage locating system as set forth in claim 1, further comprising:

said body member of said remote transceiver assembly comprising a ring member, said ring member being adapted for receiving keys of the user such that said body member is selectively coupled to the keys of the user.

7. A luggage locating system for locating luggage of a user in an airport, the luggage locating system comprising:

a remote transceiver assembly comprising a body member, said body member being adapted for being held in a hand of the user, said remote transceiver assembly comprising a first transceiver means for transmitting a unique remote signal, said first transceiver means being positioned within said body member, said remote transceiver assembly comprising a button member, said button member being operationally coupled to said first transceiver means such that said button member is for actuating said first transceiver means to transmit said unique remote signal, said remote transceiver assembly comprising a remote power supply being operationally coupled to said first transceiver such that said remote power supply supplies power to said first transceiver;

a base transceiver assembly comprising a housing, said housing being adapted for being mounted to the luggage, said base transceiver assembly comprising a second transceiver means for transmitting a unique luggage signal, said second transceiver means transmitting said unique luggage signal to said first transceiver means when said second transceiver means has received said unique remote signal from said first transceiver means, said second transceiver means being positioned within said housing of said base transceiver assembly, said base transceiver assembly comprising a base power supply such that said base power supply supplies power to said second transceiver means;

said first transceiver assembly comprising an indicator assembly, said indicator assembly being operationally coupled to said first transceiver means such that said first transceiver means actuates said indicator assembly for indicating to the user that said base transceiver assembly is within a predetermined range of the user when said first transceiver means receives said unique luggage signal from said second transceiver means;

said base transceiver assembly comprising a base light emitting member, said base light emitting member being operationally coupled to said second transceiver means such that said base light emitting member emits light when said second transceiver means has received said unique remote signal;

said indicator assembly of said remote transceiver assembly comprising at least one remote light emitting member, said remote light emitting member being operationally coupled to said first transceiver means such that said remote light emitting member emits light when said first transceiver means has received said unique luggage signal, said remote light emitting member being adapted for indicating to the user that said base transceiver assembly is within the predetermined distance when said remote light emitting member emits light;

said indicator assembly of said remote transceiver assembly comprising a vibrating means for vibrating said body member of said remote transceiver assembly, said vibrating means being operationally coupled to said first transceiver means such that said vibrating means vibrates said body member when said first transceiver means has received said unique luggage signal, said vibrating means being adapted for indicating to the user that said base transceiver assembly is within the predetermined distance when said vibrating means vibrates the body member;

said first transceiver means of said remote transceiver assembly intermittently transmitting a timing signal, said second transceiver means of said base transceiver assembly receiving said timing signal and transmitting said timing signal back to said first transceiver means of said remote transceiver assembly, said first transceiver means timing a time between transmission of said timing signal and reception of the timing signal by said first transceiver means for determining whether said base transceiver assembly is getting closer to said remote transceiver assembly, said first transceiver means actuating said indicator assembly for indicating that said base transceiver assembly is getting farther away from said remote transceiver assembly; and said body member of said remote transceiver assembly comprising a ring member, said ring member being adapted for receiving keys of the user such that said body member is selectively coupled to the keys of the user.

* * * * *